(12) United States Patent
Eguchi

(10) Patent No.: US 10,291,070 B2
(45) Date of Patent: May 14, 2019

(54) POWER RECEPTION APPARATUS, METHOD FOR CONTROLLING THE SAME, AND PROGRAM

(71) Applicant: CANON KABUSHIKI KAISHA, Tokyo (JP)

(72) Inventor: Tadashi Eguchi, Tokyo (JP)

(73) Assignee: Canon Kabushiki Kaisha, Tokyo (JP)

(\*) Notice: Subject to any disclaimer, the term of this patent is extended or adjusted under 35 U.S.C. 154(b) by 132 days.

(21) Appl. No.: 14/908,100

(22) PCT Filed: Jul. 8, 2014

(86) PCT No.: PCT/JP2014/003832
§ 371 (c)(1),
(2) Date: Jan. 27, 2016

(87) PCT Pub. No.: WO2015/015751
PCT Pub. Date: Feb. 5, 2015

(65) Prior Publication Data
US 2016/0211703 A1 Jul. 21, 2016

(30) Foreign Application Priority Data
Jul. 29, 2013 (JP) ................. 2013-156718

(51) Int. Cl.
*H02J 5/00* (2016.01)
*H04B 5/00* (2006.01)
(Continued)

(52) U.S. Cl.
CPC .............. *H02J 50/12* (2016.02); *H02J 50/40* (2016.02); *H02J 50/80* (2016.02); *H04B 5/0037* (2013.01); *H02J 5/005* (2013.01); *H02J 17/00* (2013.01)

(58) Field of Classification Search
CPC .. H02J 50/10; H02J 50/12; H02J 50/80; H02J 5/005; H02J 17/00; H04B 5/0025; H04B 5/0037
(Continued)

(56) References Cited

U.S. PATENT DOCUMENTS

2010/0264746 A1 10/2010 Kazama
2012/0049791 A1 3/2012 Tanabe
(Continued)

FOREIGN PATENT DOCUMENTS

JP 2010239781 A 10/2010
JP 2012-516131 A 7/2012
JP 2012161145 A 8/2012

*Primary Examiner* — Lincoln D Donovan
*Assistant Examiner* — Diana J. Cheng
(74) *Attorney, Agent, or Firm* — Canon U.S.A., Inc. IP Division

(57) ABSTRACT

An object of the present invention is to transmit a request for a setting of power transmission in accordance with change of power consumption to a power transmission apparatus. A power reception apparatus according to the present invention includes a power reception unit which wirelessly receives electric power from a power transmission apparatus, a detection unit which detects an instruction for controlling a load unit which operates using the electric power received by the power reception unit, and a transmission unit which transmits, to the power transmission apparatus, a request for changing an amount of reception power in accordance with change of an amount of power consumption of the load unit caused when the load unit is operated in response to the instruction detected by the detection unit while the power reception unit receives the electric power, before the load unit is operated in response to the instruction.

17 Claims, 11 Drawing Sheets

(51) Int. Cl.
   *H02J 50/12* (2016.01)
   *H02J 50/40* (2016.01)
   *H02J 50/80* (2016.01)
   *H02J 17/00* (2006.01)

(58) Field of Classification Search
   USPC .................................. 307/104; 320/108, 137
   See application file for complete search history.

(56) References Cited

U.S. PATENT DOCUMENTS

2013/0181665 A1    7/2013  Lee
2014/0327409 A1*  11/2014  Lee ........................ H02J 7/025
                                                                320/137

* cited by examiner

POWER RECEPTION APPARATUS, METHOD FOR CONTROLLING THE SAME, AND PROGRAM

TECHNICAL FIELD

The present invention relates to a wireless power transmission technique.

BACKGROUND ART

In recent years, a wireless power transmission system including a power transmission apparatus which transmits electric power in a wireless manner without connection by a connector and a power reception apparatus which receives electric power supplied from the power transmission apparatus has been widely used. PTL1 discloses power transmission performed by a power transmission apparatus to a plurality of power reception apparatuses.

When a power reception apparatus operates using electric power received by wireless power transmission, the electric power to be received by the power reception apparatus momently changes in accordance with a state of the operation. Since power reception amounts of the power reception apparatuses change, there arises a problem in that, when a single power transmission apparatus simultaneously transmits electric power to a plurality of power reception apparatuses, reception power of one of the power reception apparatuses changes in accordance with change of power consumption, and therefore, reception power of the other power reception apparatuses also change. For example, while a power transmission apparatus transmits electric power to first and second power reception apparatuses, power consumption of the second power reception apparatus is reduced, and accordingly, reception power is also reduced. In this case, surplus of electric power to be supplied to the second power reception apparatus is generated due to change of the power consumption of the second power reception apparatus which causes an overvoltage state. It is possible that a wireless power transmission circuit of a power transmission apparatus and a wireless power transmission circuit of the first power reception apparatus in which power consumption thereof does not change are destroyed due to the overvoltage. Furthermore, while electric power is supplied to the first and second power reception apparatuses, power consumption of the second power reception apparatus increases, and therefore, reception power is also increased, for example. In this case, reception power is increased with the change of the power consumption of the second power reception apparatus and electric power to be supplied to the first power reception apparatus runs out, and accordingly, an instantaneous interruption state of electric power is entered. When the instantaneous interruption occurs, operation of a load operated by electric power received by the first power reception apparatus in which the consumption power does not change may fail.

CITATION LIST

Patent Literature

[PTL 1]
PCT Japanese Translation Patent Publication No. 2012-516131

SUMMARY OF INVENTION

Solution to Problem

A power reception apparatus according to the present invention includes a power reception unit configured to receive electric power from a power transmission apparatus in a wireless manner, a detection unit configured to detect an instruction for controlling a load unit which operates using the electric power received by the power reception unit; and a transmission unit configured to transmit, to the power transmission apparatus, a request for changing an amount of reception power in accordance with change of an amount of power consumption of the load unit caused when the load unit is operated in response to the instruction detected by the detection unit while the power reception unit receives the electric power, before the load unit is operated in response to the instruction.

Further features of the present invention will become apparent from the following description of exemplary embodiments with reference to the attached drawings.

Advantageous Effects of Invention

According to the foregoing exemplary embodiment, a setting associated with power transmission may be requested to the power transmission apparatus in accordance with change of an amount of power consumption of a load in response to an instruction for controlling the load which operates using received electric power.

DESCRIPTION OF EMBODIMENT

Figure 1:
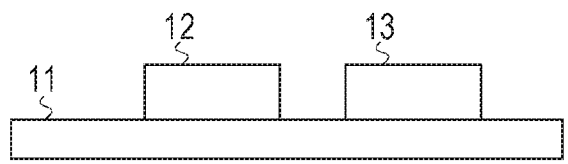
FIG. 1 is a diagram illustrating an example of a configuration of a system which performs wireless power transmission.

In this exemplary embodiment, a reception apparatus requests a setting of power transmission in accordance with change of power consumption to a power transmission apparatus. Hereinafter, the exemplary embodiment of the present invention will be described in detail with reference to the accompanying drawings. A wireless power transmission system which performs wireless power transmission according to this exemplary embodiment is illustrated in FIG. 1. Note that the wireless power transmission system of this exemplary embodiment performs wireless power transmission using a magnetic resonance method. In the magnetic resonance method, power is transmitted by coupling generated by resonance of a magnetic field between a resonator (a resonance element) of a power transmission apparatus and a resonator (a resonance element) of a power reception apparatus. Although the wireless power transmission system employing the magnetic resonance method is taken as an example in this exemplary embodiment, any wireless power transmission method (a non-contact power transmission method) may be used, such as power transmission methods using electromagnetic induction, electric field resonance, micro waves, laser beams (light), and the like.

Figure 2:
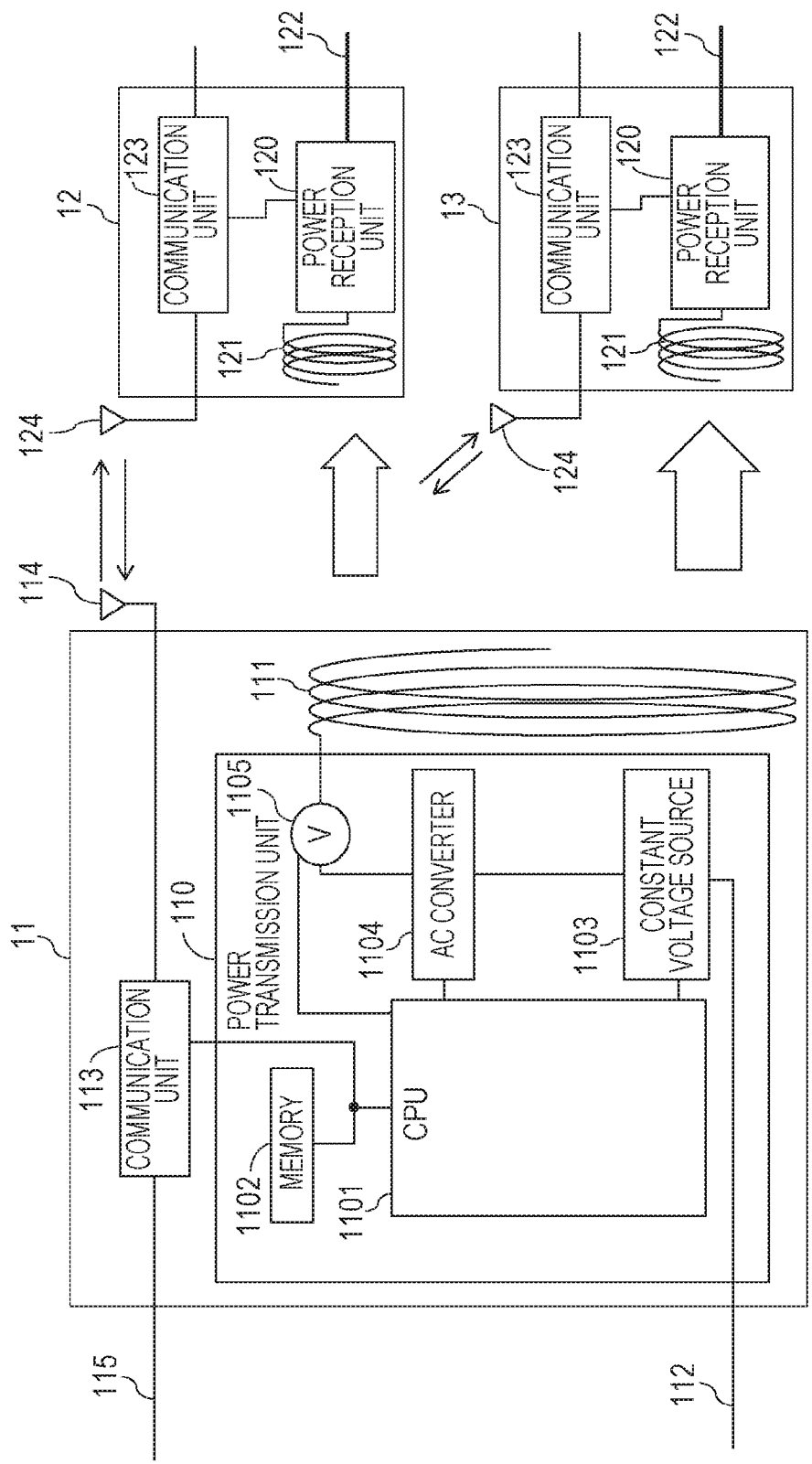
FIG. 2 is a block diagram illustrating an example of a hardware configuration of a power transmission apparatus.

In FIG. 1, a reference numeral 11 denotes a power transmission apparatus, a reference numeral 12 denotes a first power reception apparatus, and a reference numeral 13 denotes a second power reception apparatus. The power transmission apparatus 11 may simultaneously transmit electric power to a plurality of power reception apparatuses in a wireless manner. A configuration of the wireless power transmission system, particularly, a configuration of the power transmission apparatus 11 is illustrated in FIG. 2. The power transmission apparatus 11 of FIG. 2 includes a power transmission unit 110. The power transmission unit 110 converts direct current or alternate current supplied from a power transmission line 112 into AC frequency power and transmits the electric power to at least one of the first power reception apparatus 12 and the second power reception apparatus 13 through a power transmission antenna coil 111. The first and second power reception apparatuses 12 and 13 include respective power reception units 120 which convert AC power supplied through respective power reception antenna coils 121 into DC power or AC power of a desired frequency and output the converted power to respective power transmission lines 122.

The power transmission apparatus 11 includes a communication unit 113, and the first and second power reception apparatuses 12 and 13 include respective communication units 123. The communication unit 113 and the communication units 123 perform wireless communication. The communication units 113 and 123 have a communication function based on Bluetooth (registered trademark) 4.0 standard, for example. The power transmission apparatus 11 and the first and second power reception apparatuses 12 and 13 perform wireless communication such that electric waves are transmitted and received between antennas 114 and 124. Although the communication units 113 and 123 are based on BT 4.0, other communication standards may be employed. Examples of the communication standards include a wireless LAN (IEEE802.11 series) and NFC (Near Field Communication). The power transmission apparatus 11 and the first power reception apparatus 12 or the second power reception apparatus 13 perform wireless communication so as to perform authentication associated with wireless power transmission and transmit and receive control information associated with the wireless power transmission.

The power transmission unit 110 includes a constant voltage source 1103 and a CPU 1101 which controls transmission power in accordance with electric power required for power reception. An AC converter 1104 converts direct current or alternate current of commercial power or the like into a current of a frequency used for power transmission. An AC voltmeter 1105 detects voltages of the power transmission antenna coil 111 and the AC converter 1104. A memory 1102 stores identification information (ID) of power reception apparatuses obtained through apparatus authentication performed by the communication unit 113 and control programs for realizing operations of the power transmission apparatus 11 which will be described hereinafter. The CPU 1101 executes the control programs stored in the memory 1102 so as to perform control of the entire apparatus and a power transmission process. Here, the term "CPU" is an abbreviation of "Central Processing Unit".

Figure 3:
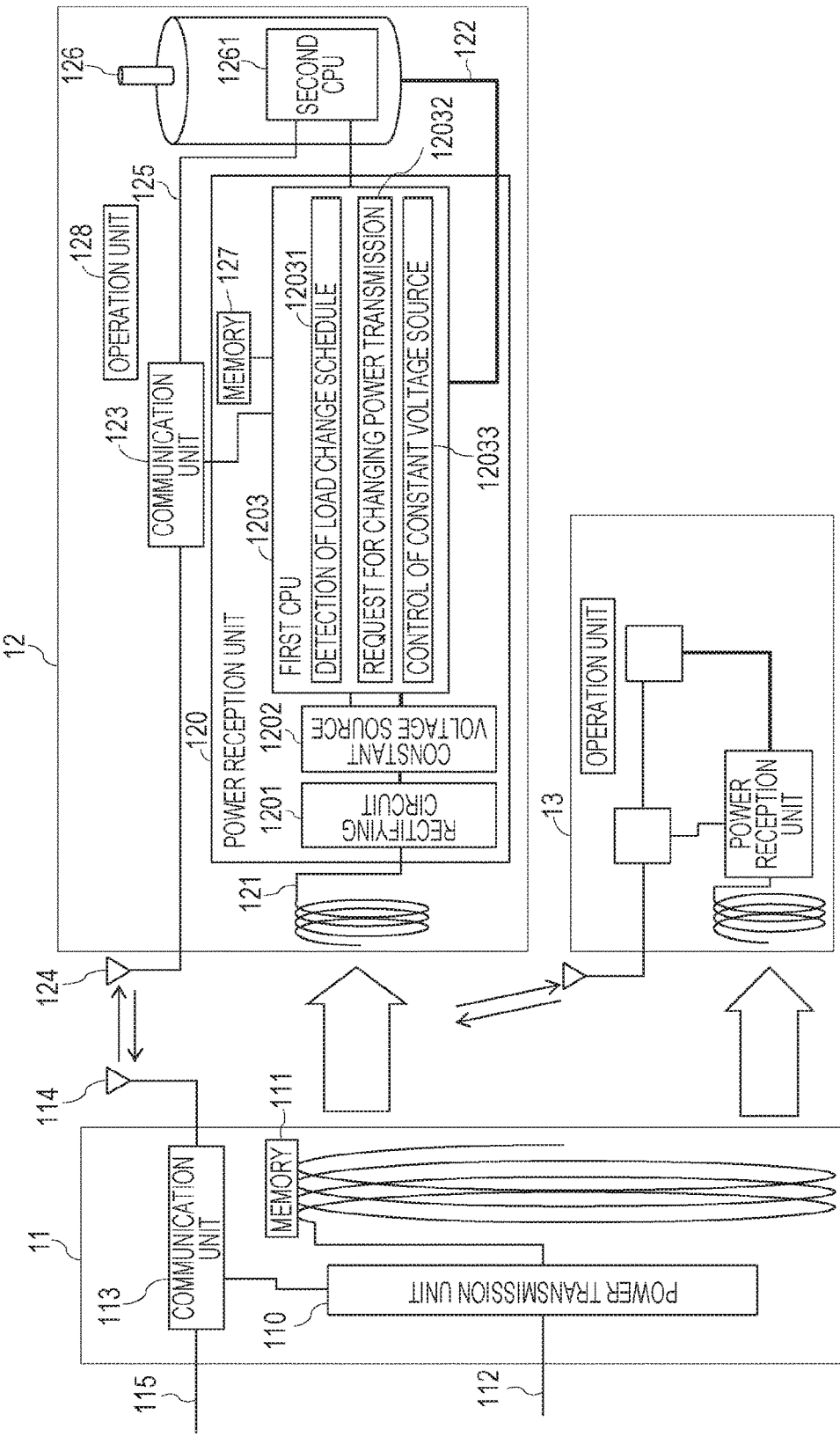
FIG. 3 is a block diagram illustrating an example of a hardware configuration of a power reception apparatus.

Next, a configuration of the wireless power transmission system, particularly, a configuration of the power reception apparatus 12 is illustrated in FIG. 3. The power reception unit 120 includes a rectifying circuit 1201, a constant voltage source 1202, a first CPU 1203, and a memory 127. The rectifying circuit 1201 rectifies high-frequency power received by the power reception antenna coil 121 so as to generate direct current. The constant voltage source 1202 is a circuit which receives input from the rectifying circuit 1201 and outputs a constant voltage. Here, the constant voltage source 1202 controls output so as to obtain a level of a DC voltage for operating a load 126, which will be described hereinafter, and supplies the controlled voltage to the load 126. The first CPU 1203 executes the control programs stored in the memory 127 so as to perform control of hardware and a power reception process.

The load 126 is operated by electric power received by the power reception unit 120. The load 126 is a motor in this exemplary embodiment. The first power reception apparatus 12 is a network camera, and the load 126 is used to drive an image pickup unit for changing an image pickup region of the network camera. Furthermore, the load 126 includes a second CPU 1261 which performs various operations and hardware control so as to execute processes realized by the load 126. The second CPU 1261 drives the load 126 (the motor) and controls the image pickup region of the network camera. An operation unit 128 is used by a user to perform various input operations and the like so as to operate the power reception apparatus 12. The operation unit 128 stores a flag corresponding to an input in the memory 127.

Figure 4:
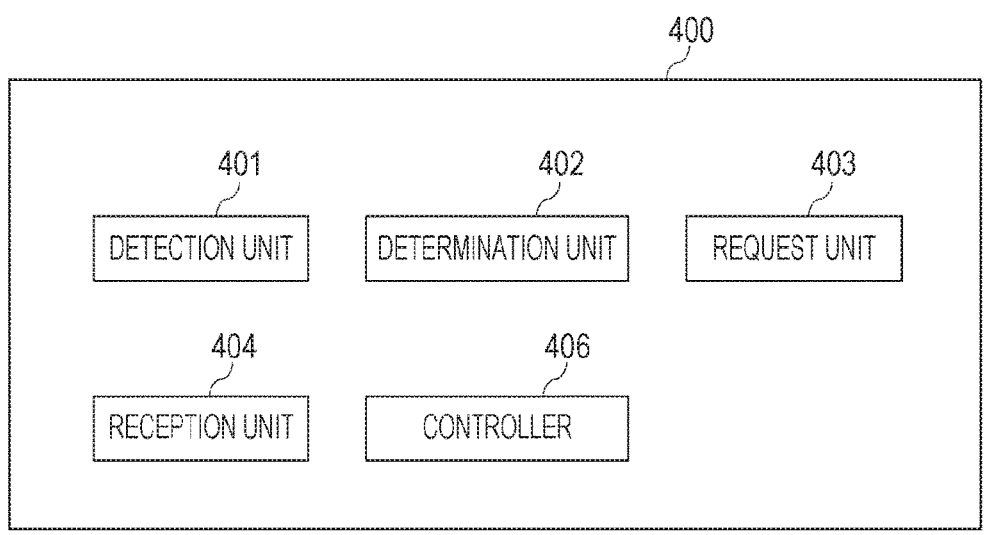
FIG. 4 is a block diagram illustrating a functional configuration of the power reception apparatus.

Next, configurations of functional blocks of a power reception apparatus which are realized when the first CPU 1203 executes the control programs stored in the memory 127 so as to perform control of the hardware and calculation of information will be described. The functional blocks perform processes illustrated in a flowchart described below and a power reception function. Although the functional configurations are realized by software, the functional configurations may be realized by hardware such as an ASIC (Application Specific Integrated Circuit). In FIG. 4, a reference numeral 400 denotes a power reception apparatus. A detection unit 401 detects an operation instruction which requires change of power consumption of a load. The detection unit 401 detects an operation instruction through a user's operation performed by the operation unit 128 or the communication unit 123 (or other interfaces). A determination unit 402 determines whether the change of an amount of power consumption caused by the detected operation instruction exceeds a predetermined threshold value. A request unit 403 transmits a transmission power change request to a power transmission apparatus through the communication unit 123 and requests change of an amount of electric power in accordance with the change of an amount of power consumption to the power transmission apparatus. Furthermore, the request unit 403 requests start of power transmission from the power transmission apparatus. A reception unit 404 receives various information including a response to the request from the request unit 403 through the communication unit 123. A controller 406 causes the second CPU 1261 to control operation of the load 126.

Figure 5:
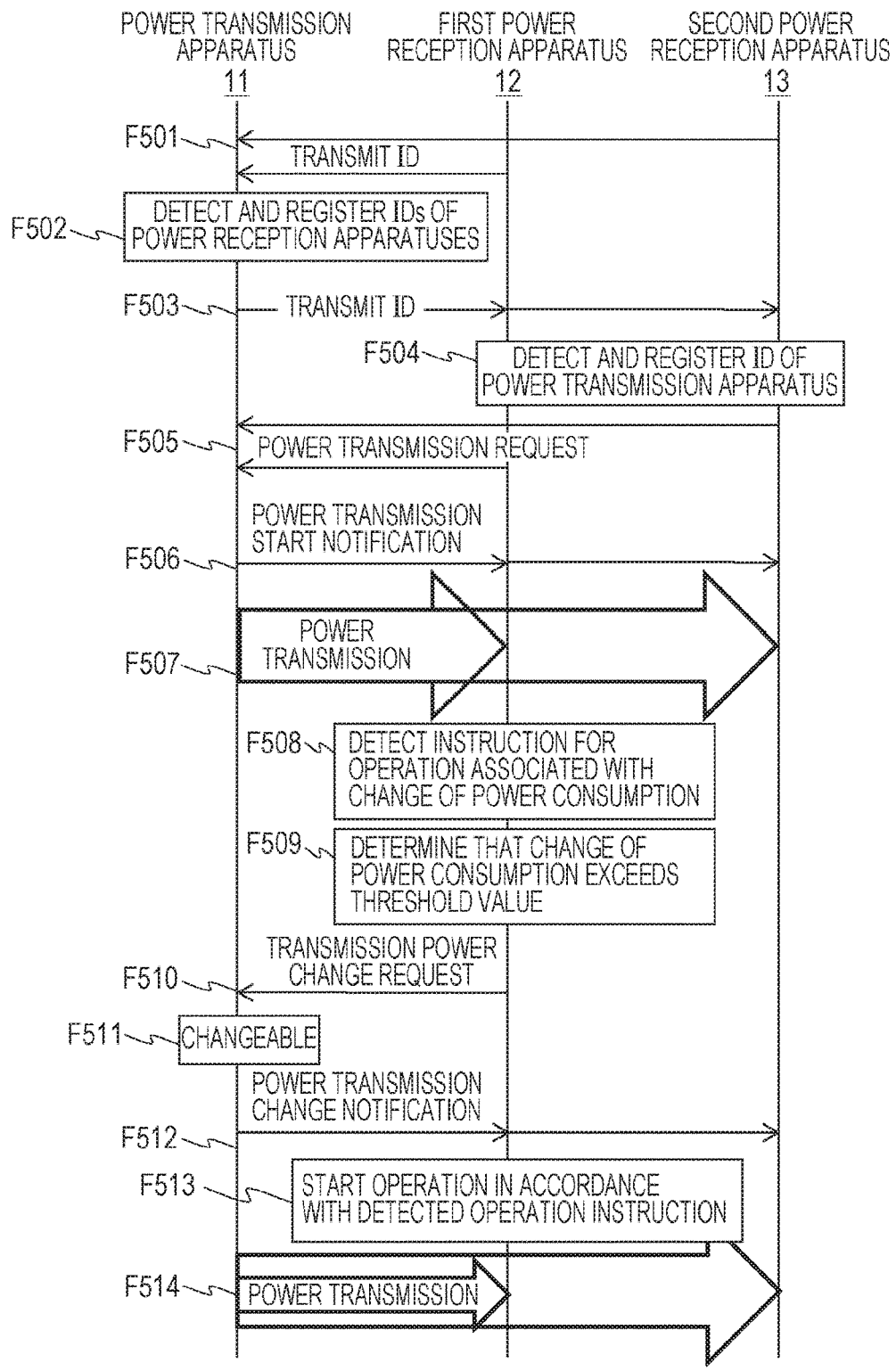
FIG. 5 is a sequence chart of the wireless power transmission system.

Next, operation of the wireless power transmission system having the configuration described above will be described with reference to the accompanying drawings. FIG. 5 is a sequence chart of the wireless power transmission system of this exemplary embodiment. First, in the wireless power transmission system of this exemplary embodiment, the power transmission apparatus 11 specifies power transmission partners by checking identification information (ID) of the power reception apparatuses 12 and 13 before starting power transmission. Similarly, the power reception apparatuses 12 and 13 specify a partner from which electric power is transmitted by checking identification information of the power transmission apparatus 11 before performing power reception. A power transmission apparatus capable of transmitting electric power to a plurality of power reception apparatuses exchanges identification information with the power reception apparatuses every time the power transmission apparatus detects a power reception apparatus, and registers the identification information (ID) of the power reception apparatus which is a partner for power transmission. Then the power transmission apparatus starts power transmission to the registered power reception apparatus. Since IDs of power reception apparatuses are registered, the power transmission apparatus may perform appropriate power transmission control for individual power reception apparatuses. When detecting an electromagnetic wave emitted from the power transmission apparatus 11 or when detecting an instruction for performing a power reception operation, the communication units 123 of the first and second power reception apparatuses 12 and 13 transmit IDs of themselves to the power transmission apparatus 11 (F501). When receiving the IDs of the first and second power reception apparatuses 12 and 13, the power transmission apparatus 11 registers the received IDs and transmits a response message including identification information of itself to the first and second power reception apparatuses 12 and 13 corresponding to the IDs through the communication unit 113 (F502 and F503). When receiving the response message including the identification information of the power transmission apparatus 11 through the communication units 123, the first and second power reception apparatuses 12 and 13 register the received ID (F504).

Thereafter, the communication units 123 of the first and second power reception apparatuses 12 and 13 transmit a power transmission request for requesting start of power transmission including a value of required electric power to the power transmission apparatus 11 (F505). When power transmission is available for the received power transmission request, the power transmission apparatus 11 returns a power transmission start notification (S506). The power transmission start notification includes information on a total amount of electric power to be transmitted by the power transmission apparatus 11. The total amount of electric power to be transmitted represents a sum of electric power to be transmitted to the first and second power reception apparatuses 12 and 13 which are targets of the power transmission.

The power transmission unit 110 of the power transmission apparatus 11 transmits electric power to the first and second power reception apparatuses 12 and 13 (F507). Here, it is assumed that the detection unit 401 of the first power reception apparatus 12 detects an operation instruction for controlling the load 126 which requires change of an amount of power consumption while the load 126 is operated using electric power supplied from the power transmission apparatus 11 (F508). Examples of the operation instruction which requires change of an amount of power consumption include an instruction for starting driving when the load 126 is a motor. Since the first power reception apparatus 12 is a network camera, the detection unit 401 detects an instruction for changing an image pickup region (tilt or pan) through a user's operation performed by the operation unit 128 or the communication unit 123 (or other interfaces).

Subsequently, the determination unit 402 of the first power reception apparatus 12 determines whether the change of an amount of power consumption caused by the detected operation instruction exceeds a predetermined threshold value (F509). Here, the predetermined threshold value may be uniquely determined in a system. In general, when electric power received by a power reception apparatus instantaneously increases by 100%, for example, a wireless power transmission circuit may be destroyed due to overvoltage. Therefore, when the power consumption is reduced, the determination unit 402 determines whether an amount of power consumption changes in a range equal to or larger than the smallest electric power (5 W, for example) which is receivable by the power reception apparatus and which is determined in the system. Specifically, the determination unit 402 determines whether it is possible that electric power received by the other power reception apparatus increases by 100% due to the change of an amount of power consumption of the apparatus including the determination unit 402.

Furthermore, depending on a load operated using reception power, operation of the load is stopped when the received power is temporarily reduced, and accordingly, a fatal error may occur. For example, in a case where the load is an HDD drive, if operation of the HDD drive stops during a storage process, a disk is moved in a state in which a disk reading head is positioned on the disk, and accordingly, the reading head and the disk may be damaged. Accordingly, when the power consumption is increased, the determination unit 402 determines whether power consumption changes in a range equal to or larger than a value (1 W, for example, corresponding to 20% of operation power of the smallest load) which does not cause instantaneous interruption in the operation power (5 W, for example) of the smallest load determined in the system. As described above, different threshold values may be set for a case where power consumption of the load 126 is increased and a case where the power consumption of the load 126 is reduced (reduction in 5 W or more or increase in 1 W or more in the examples above). Furthermore, the threshold value may be determined in accordance with the operation power of the load 126.

When the determination unit 402 determines that the change of an amount of power consumption exceeds the predetermined threshold value due to operation performed in response to the operation instruction detected by the detection unit 401, the request unit 403 transmits a transmission power change request for requesting change of an amount of electric power in accordance with the change of an amount of power consumption to the power transmission apparatus 11 (F510). Specifically, the request unit 403 requests a setting of power transmission performed in accordance with the change of an amount of power consumption when the load 126 is operated in accordance with the detected instruction to the power transmission apparatus. For example, in a case where power consumption is increased when the operation instruction detected by the detection unit 401 is executed, the request unit 403 further requests electric power corresponding to an amount of the increase to the power transmission apparatus 11. Furthermore, in a case where power consumption is reduced when the operation instruction detected by the detection unit 401 is executed, the request unit 403 requests electric power corresponding to an amount of electric power from which the reduced electric power is subtracted. By this, before the change of an amount of power consumption of the load 126, the power reception apparatus requests transmission of electric power to be required after an amount of the power consumption is changed to the power transmission apparatus.

Note that, when an amount of the power consumption of the power reception apparatus 12 changes a plurality of times, a plurality of transmission power change requests including information on the changes of an amount of the electric power and information on periods of time used for the changes may be simultaneously transmitted. Assuming that the load 126 of the power reception apparatus 12 is a motor and a period of time from start of driving to end of the driving may be obtained in advance, a plurality of transmission power change requests including change of an amount of electric power required when the driving is started, change of an amount of electric power required when the driving is terminated, and information on periods of time in which executions of the changes are specified are simultaneously transmitted. Note that the requests may be performed by the request unit only when the power transmission apparatus 11 simultaneously transmits electric power to a plurality of power reception apparatuses.

The power transmission apparatus 11 determines whether an amount of electric power to be transmitted may be changed in accordance with the transmission power change request supplied from the first power reception apparatus 12 (F511). For example, the power transmission apparatus 11 determines that an amount of electric power to be transmitted may not be changed in response to the transmission power change request when electric power beyond ability of the power transmission apparatus 11 itself is requested. In the sequence chart illustrated in FIG. 5, it is determined that the change may be performed. The power transmission apparatus transmits a transmission power change notification representing that the change of an amount of electric power is to be performed to the power reception apparatuses 12 and 13 to which electric power is being supplied (F512). Specifically, the power transmission apparatus 11 transmits a response to the transmission power change request to the first and second power reception apparatuses 12 and 13. The response represents that a setting of power transmission requested by the transmission power change request is to be performed. Here, the transmission power change notification includes amounts of electric power to be transmitted to the first and second power reception apparatuses 12 and 13 after the change and a total power transmission amount. The controller 406 of the first power reception apparatus 12 controls the load 126 so as to execute the detected operation instruction when receiving the transmission power change notification representing that the power transmission apparatus 11 performs the requested change of an amount of electric power (F513). Here, the controller 406 of the first power reception apparatus 12 starts driving the motor (the load 126) in response to an instruction for changing image pickup of the network camera. The power transmission unit 110 of the power transmission apparatus 11 transmits electric power to the first and second power reception apparatuses 12 and 13 in accordance with the transmission power change notification (F514).

As described above, the first and second power reception apparatuses 12 and 13 of this exemplary embodiment transmit a request for changing an amount of reception power in accordance with change of an amount of power consumption before the change of an amount of power consumption to the power transmission apparatus 11. Accordingly, as the entire wireless power transmission system, a state in which overvoltage is applied or a state in which instantaneous interruption of power supply to a load may be prevented.

Figure 8:
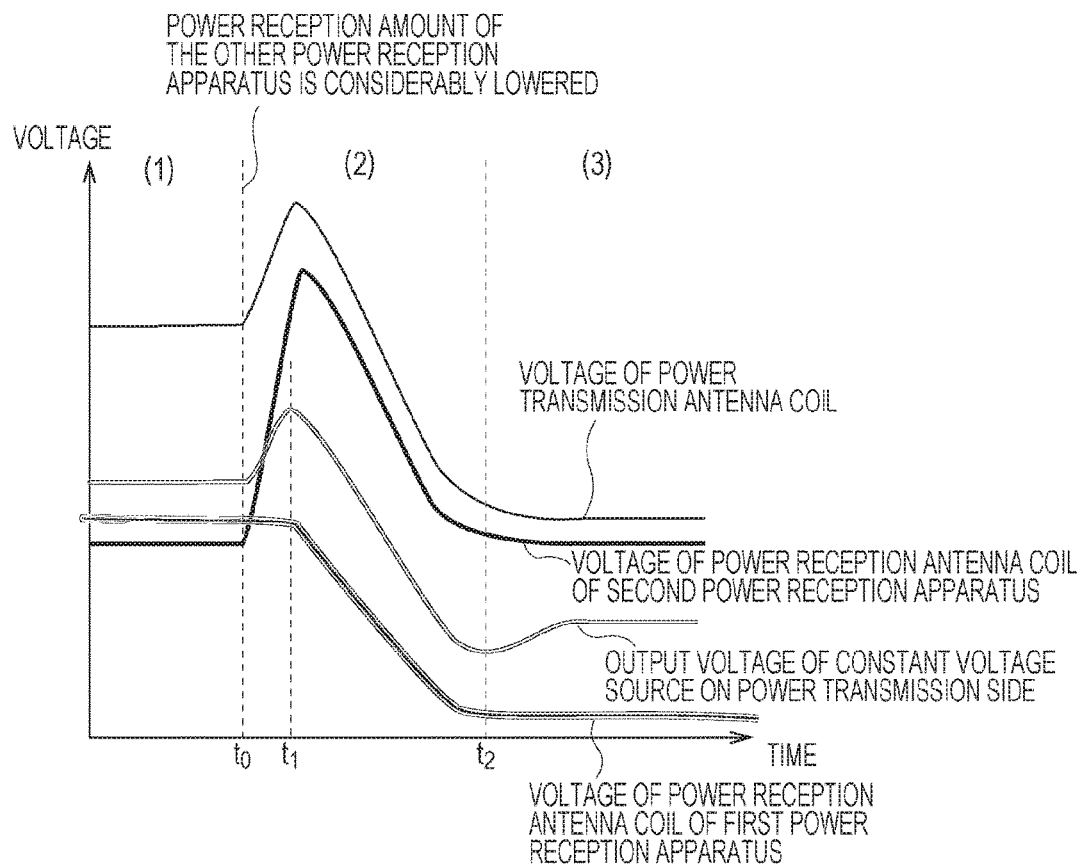
FIG. 8 is a diagram illustrating an example of change of voltages of various apparatuses.
Figure 9:
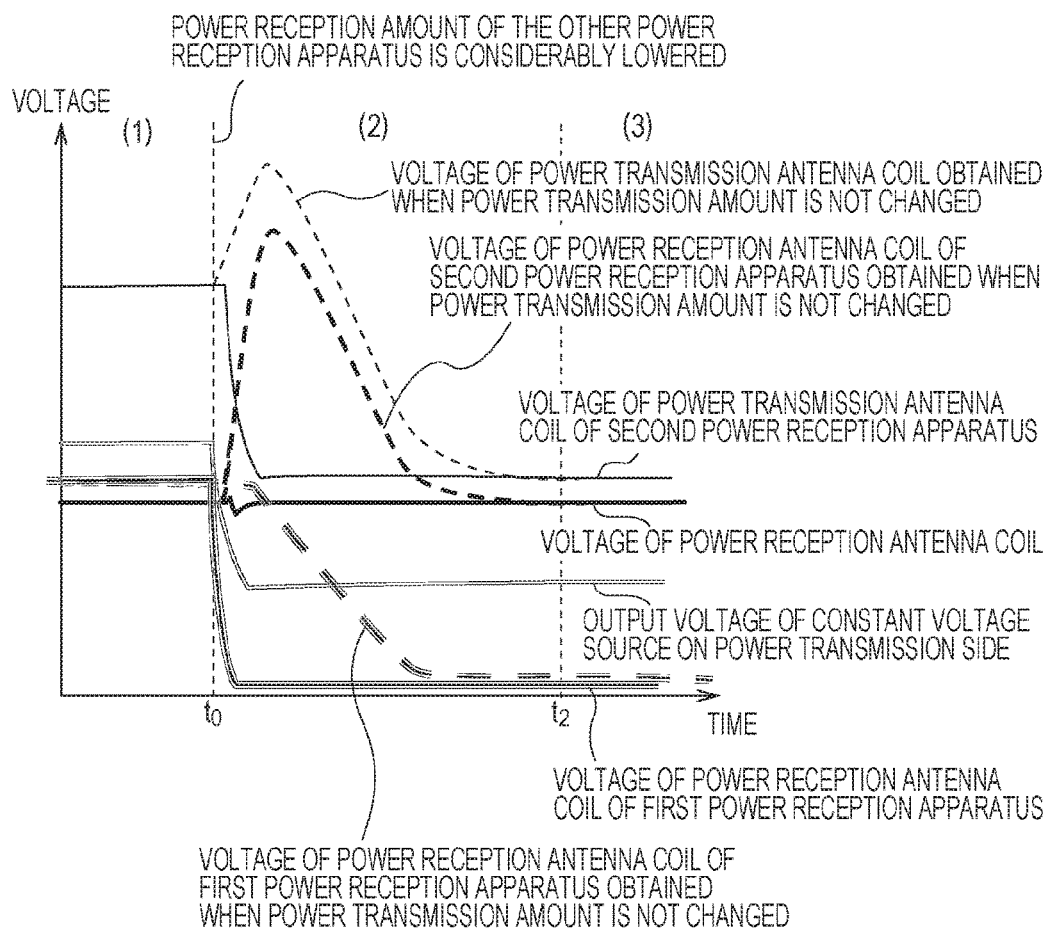
FIG. 9 is a diagram illustrating an example of change of voltages of the various apparatuses.
Figure 10:
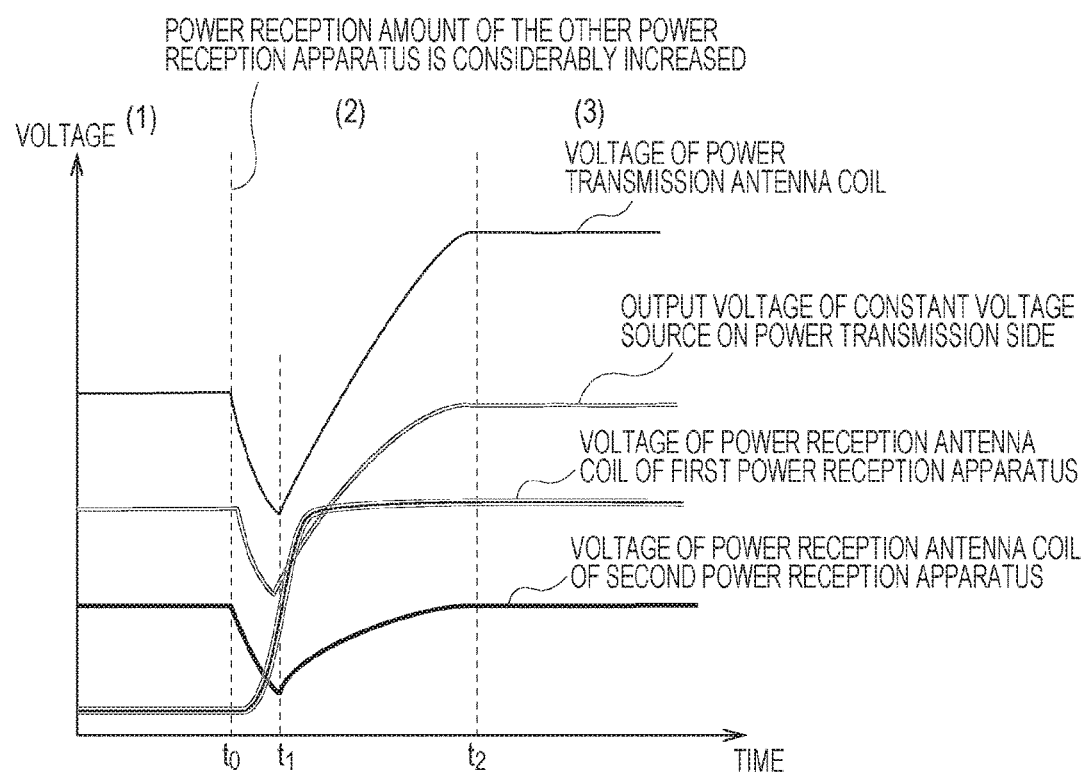
FIG. 10 is a diagram illustrating an example of change of voltages of the various apparatuses.
Figure 11:
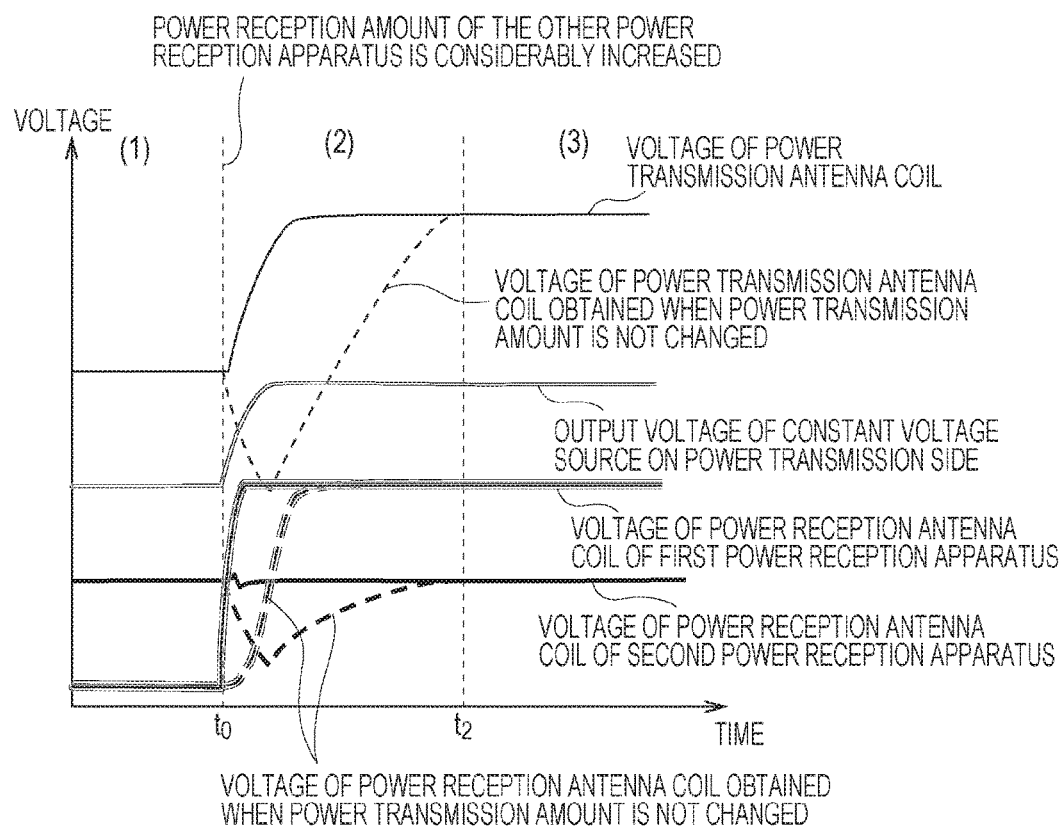
FIG. 11 is a diagram illustrating an example of change of voltages of the various apparatuses.

Change of voltages of internal circuits of the apparatuses 11, 12, and 13 in a case where the operation of the exemplary embodiment described above is not performed is illustrated in FIGS. 8 and 10, and change of voltages of the internal circuits of the apparatuses 11, 12, and 13 in a case where the operation of the exemplary embodiment is performed is illustrated in FIGS. 9 and 11.

FIG. 8 is a diagram illustrating voltages of the internal circuits of the apparatuses 11, 12, and 13 when power consumption of the first power reception apparatus 12 is reduced and the operation of the exemplary embodiment is not performed. In FIG. 8, a DC output voltage of the constant voltage source 1103 of the power transmission apparatus 11, an AC voltage of the power transmission antenna coil 111, an AC voltage of the power reception antenna coil 121 of the second power reception apparatus 13, and an AC voltage of the power reception antenna coil 121 of the first power reception apparatus 12 are illustrated. Furthermore, a region (1) represents a period of time in which the two power reception apparatuses, that is, the first power reception apparatus 12 and the second power reception apparatus 13 are receiving electric power, and at a time point t0, power consumption of the first power reception apparatus 12 is reduced and a power reception amount is considerably reduced. Furthermore, a region (3) represents a period of time in which electric power is stably supplied to the first power reception apparatus 12 from the power transmission apparatus 11 which copes with the change of an amount of the power consumption after the power consumption of the first power reception apparatus 12 is reduced, and a region (2) represents a period of time for transition from the state of (1) to the state of (3).

The power transmission antenna coil 111 and the constant voltage source 1103 of the power transmission apparatus 11 enter an overvoltage state since electric power to be supplied to the first power reception apparatus 12 becomes excessive power immediately after the time point t0. Since power transmission current of the power transmission apparatus 11 is reduced due to the excessive current, the voltage of the constant voltage source 1103 is reduced (at a time point t1). Thereafter, the power transmission apparatus 11 controls the voltage of the constant voltage source 1103 so that the voltage of the constant voltage source 1103 corresponds to a current value required for power transmission to the first power reception apparatus 12 in which the amount of the power consumption is changed and the second power reception apparatus 13 (at a time point t2).

Here, an AC voltage of the power transmission antenna coil 111 rises due to the overvoltage as represented by a thin solid line, and thereafter, starts dropping along with drop of output of the constant voltage source 1103 so that a voltage in a steady state is obtained as illustrated in the region (3). The voltage of the power reception antenna coil 121 of the second power reception apparatus 13 enters an overvoltage state immediately after the amount of the power consumption of the first power reception apparatus 12 is changed. In this case, the power reception antenna coil 121, the rectifying circuit 1201, and the constant voltage source 1202 connected to the rectifying circuit 1201 may be destroyed by the overvoltage.

FIG. 9 is a diagram illustrating voltages of the internal circuits of the apparatuses 11, 12, and 13 when the power consumption of the first power reception apparatus 12 is reduced and the operation of this exemplary embodiment is performed. FIG. 9 is a graph illustrating changes of an AC voltage of the power transmission antenna coil 111, an output DC voltage of the constant voltage source 1103 of the power transmission apparatus 11, an AC voltage of the power reception antenna coil 121 of the first power reception apparatus 12, and an AC voltage of the power reception antenna coil 121 of the second power reception apparatus 13. When rapid drop of the power consumption of the first power reception apparatus 12 of FIG. 8 is detected, the first power reception apparatus 12 transmits a transmission power change request to the power transmission apparatus 11. The constant voltage source 1103 of the power transmission apparatus 11 reduces an output DC voltage so that the output DC voltage corresponds to a value of electric power requested by the first power reception apparatus 12 (t0). Furthermore, in synchronization with the drop of the output DC voltage of the power transmission apparatus 11, the first power reception apparatus 12 reduces the power consumption, and accordingly, excessive current as illustrated in FIG. 8 does not occur and occurrence of the overvoltage state is suppressed. Change of the voltage of the power reception antenna coil 121 of the second power reception apparatus 13 in which the power consumption does not change is also negligible even immediately after the change of the amount of the power consumption of the first power reception apparatus 12, and occurrence of the overvoltage state is suppressed.

FIG. 10 is a diagram illustrating voltages of the internal circuits of the apparatuses 11, 12, and 13 when power consumption of the first power reception apparatus 12 is increased and the operation of this exemplary embodiment is not performed. In FIG. 10, a DC output voltage of the constant voltage source 1103 of the power transmission apparatus 11, an AC voltage of the power transmission antenna coil 111, an AC voltage of the power reception antenna coil 121 of the second power reception apparatus 13, and an AC voltage of the power reception antenna coil 121 of the first power reception apparatus 12 are illustrated. Furthermore, a region (1) represents a period of time in which the two power reception apparatuses, that is, the first power reception apparatus 12 and the second power reception apparatus 13, are receiving electric power, and at a time point t0, power consumption of the first power reception apparatus 12 is increased and a power reception amount is considerably increased. Furthermore, a region (3) represents a period of time in which electric power is stably supplied to the first power reception apparatus 12 from the power transmission apparatus 11 which copes with the change of the power consumption of the first power reception apparatus 12 after the power consumption is increased, and a region (2) represents a period of time for transition from the state of the region (1) to the state of the region (3).

The power transmission antenna coil 111 and the constant voltage source 1103 of the power transmission apparatus 11 enter a voltage dropping state since electric power to be supplied to the second power reception apparatus 13 is received by the first power reception apparatus 12 immediately after a time point t0. The power transmission apparatus 11 increases the voltage of the constant voltage source 1103 since power transmission current is increased due to power shortage (at a time point t1). Thereafter, the power transmission apparatus 11 controls the voltage of the constant voltage source 1103 so that the voltage of the constant voltage source 1103 corresponds to a current value required for power transmission to the first power reception apparatus 12 in which the power consumption is changed and the second power reception apparatus 13 (at a time point t2).

Here, an AC voltage of the power transmission antenna coil 111 drops due to the power shortage as represented by a thin solid line, and thereafter, start rising along with rise of output of the constant voltage source 1103 so that a voltage in a steady state is obtained as illustrated in a region (3). The power reception antenna coil 121 of the second power reception apparatus 13 enters a voltage shortage state immediately after the power consumption of the first power reception apparatus 12 is changed. In this case, the load 126 of the second power reception apparatus 13 enters an instantaneous interruption state of power supply, and accordingly, an operation error may occur.

FIG. 11 is a diagram illustrating voltages of the internal circuits of the apparatuses when the power consumption of the first power reception apparatus 12 is increased and the operation of this exemplary embodiment is performed. FIG. 11 is a graph illustrating changes of an AC voltage of the power transmission antenna coil 111, an output DC voltage of the constant voltage source 1103 of the power transmission apparatus 11, an AC voltage of the power reception antenna coil 121 of the second power reception apparatus 13, and an AC voltage of the power reception antenna coil 121 of the first power reception apparatus 12. When rapid rise of the power consumption of the first power reception apparatus 12 is detected, the first power reception apparatus 12 transmits a transmission power change request to the power transmission apparatus 11. The constant voltage source 1103 of the power transmission apparatus 11 increases an output DC voltage so that the output DC voltage corresponds to a value of electric power requested by the first power reception apparatus 12 (t0). Furthermore, in synchronization with the increase of the output DC voltage of the power transmission apparatus 11, the first power reception apparatus 12 increases the power consumption, and accordingly, the shortage of voltage as illustrated in FIG. 10 does not occur and occurrence of the instantaneous interruption state of power supply is suppressed. Change of the voltage of the power reception antenna coil 121 of the second power reception apparatus 13 in which an amount of the power consumption does not change is also negligible even immediately after the change of the power consumption of the first power reception apparatus 12, and occurrence of the instantaneous interruption state of power supply is suppressed.

Figure 6:
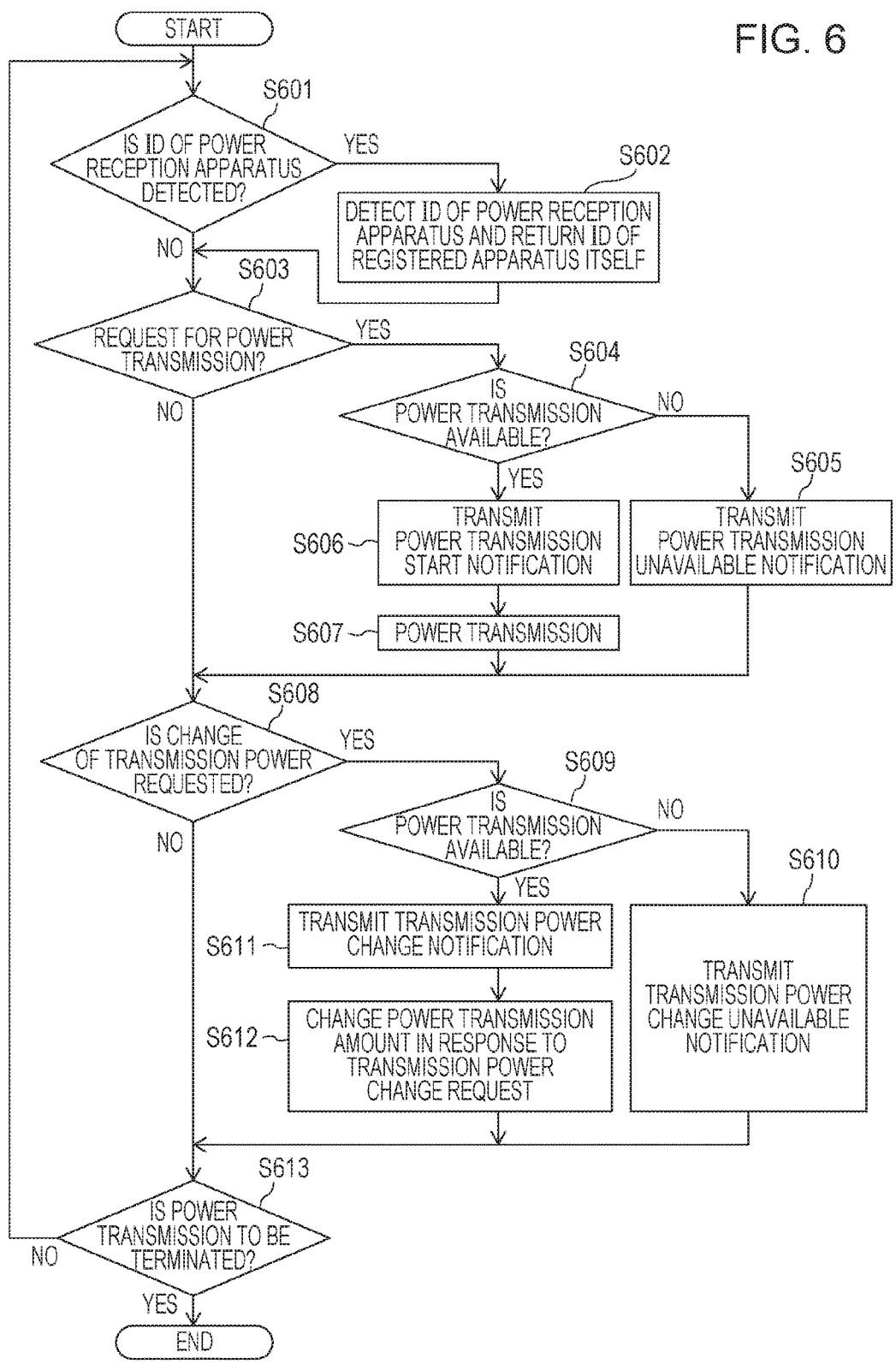
FIG. 6 is a flowchart illustrating operation of the power transmission apparatus.

Next, operation of the power transmission apparatus 11 will be described with reference to a flowchart illustrated in FIG. 6. The CPU 1101 of the power transmission apparatus 11 determines whether an ID has been supplied from a power reception apparatus through the communication unit 113 (S601). When the ID has been supplied from the power reception apparatus, the CPU 1101 stores the ID in the memory 1102 (S602). Furthermore, the CPU 1101 returns an ID of itself as a response through the communication unit 113. Subsequently, the CPU 1101 determines whether a power transmission request has been supplied from the power reception apparatus through the communication unit 113 (S603). When determining that the power transmission request has been supplied from the power reception apparatus, the CPU 1101 determines whether power transmission may be performed in response to the received power transmission requests (S604). The determination in step S604 is made in accordance with a determination as to whether the power transmission apparatus 11 has capability of transmitting electric power requested by the power reception apparatus. Furthermore, in the determination in step S604, it is determined whether a transmission source of the received power transmission request is the same as the apparatus having the ID registered in step S602. When the transmission source is not the same as the apparatus having the ID registered in step S602, power transmission to the transmission source of the received power transmission request is not started. When it is determined that the power transmission may not be performed in step S604, the CPU 1101 transmits a power transmission unavailable notification to the transmission source of the power transmission request received through the communication unit 113 (S605). Here, the power transmission unavailable notification is a message representing that start of power transmission is not allowed to be performed. On the other hand, when it is determined that the power transmission is available in step S604, the CPU 1101 transmits a power transmission start notification through the communication unit 113 (S606).

Here, the power transmission start notification is a message representing that power transmission is to be started in response to the request. When the power transmission start notification is transmitted, the CPU 1101 applies a voltage for outputting requested electric power to the constant voltage source 1103 and electromagnetic waves are irradiated from the power transmission antenna coil 111 so that power transmission is performed (S607). The power transmission apparatus 11 may transmit the power transmission start notification to be transmitted in step S606 and the power transmission unavailable notification to be transmitted in step S605 as a signal of a reception response (Ack) to the power transmission request transmitted in step S603. In this case, power transmission available/unavailable information is included in the Ack signal, and when the power transmission is available, the power transmission is started (S607).

Subsequently, the CPU 1101 of the power transmission apparatus 11 determines whether the transmission power change request has been supplied from the power reception apparatus through the communication unit 113 (S608). Here, the transmission power change request is a message representing change of an amount of reception power. When the transmission power change request is supplied from the power reception apparatus, the CPU 1101 determines whether power transmission is available in response to the change request (S609). The determination in step S609 is made in accordance with a determination as to whether the power transmission apparatus 11 has capability of transmitting electric power requested by the power reception apparatus. When it is determined that the power transmission is not available in step S609, the CPU 1101 transmits a power transmission change unavailable notification to the transmission source of the change request received through the communication unit 113 (S610). Here, the transmission power change notification is a message representing that requested change of an amount of reception power is not allowed to be performed.

On the other hand, when it is determined that the power transmission is available in step S609, the CPU 1101 transmits a transmission power change notification through the communication unit 113 (S611). Here, the transmission power change notification is a message representing that the change of an amount of transmission power is to be executed in response to the request. When the transmission power change notification is transmitted, the CPU 1101 applies a voltage for outputting the requested electric power to the constant voltage source 1103 and electromagnetic waves are irradiated from the power transmission antenna coil 111 so that change of a power transmission amount is performed (S612). Subsequently, the CPU 1101 of the power transmission apparatus 11 determines whether the power transmission is to be terminated (S613), and when it is determined that an instruction for turning off a power source, for example, is detected, the process is terminated. The power transmission apparatus 11 may transmit the transmission power change notification in step S611 and the transmission power change unavailable notification in step S610 as an Ack signal which is a response to the transmission power change request in step S608 supplied from the power reception apparatus. In this case, transmission power change available/unavailable information is included in the Ack signal, and when change of the power transmission amount is available, the power transmission amount is changed (S612). When information on a time is included in the transmission power change request, the power transmission amount is changed after a waiting time corresponding to the information on a time. If an instruction for turning off a power source or the like is not detected, and therefore, the power transmission is not terminated, the process from step S601 is performed again.

Figure 7:
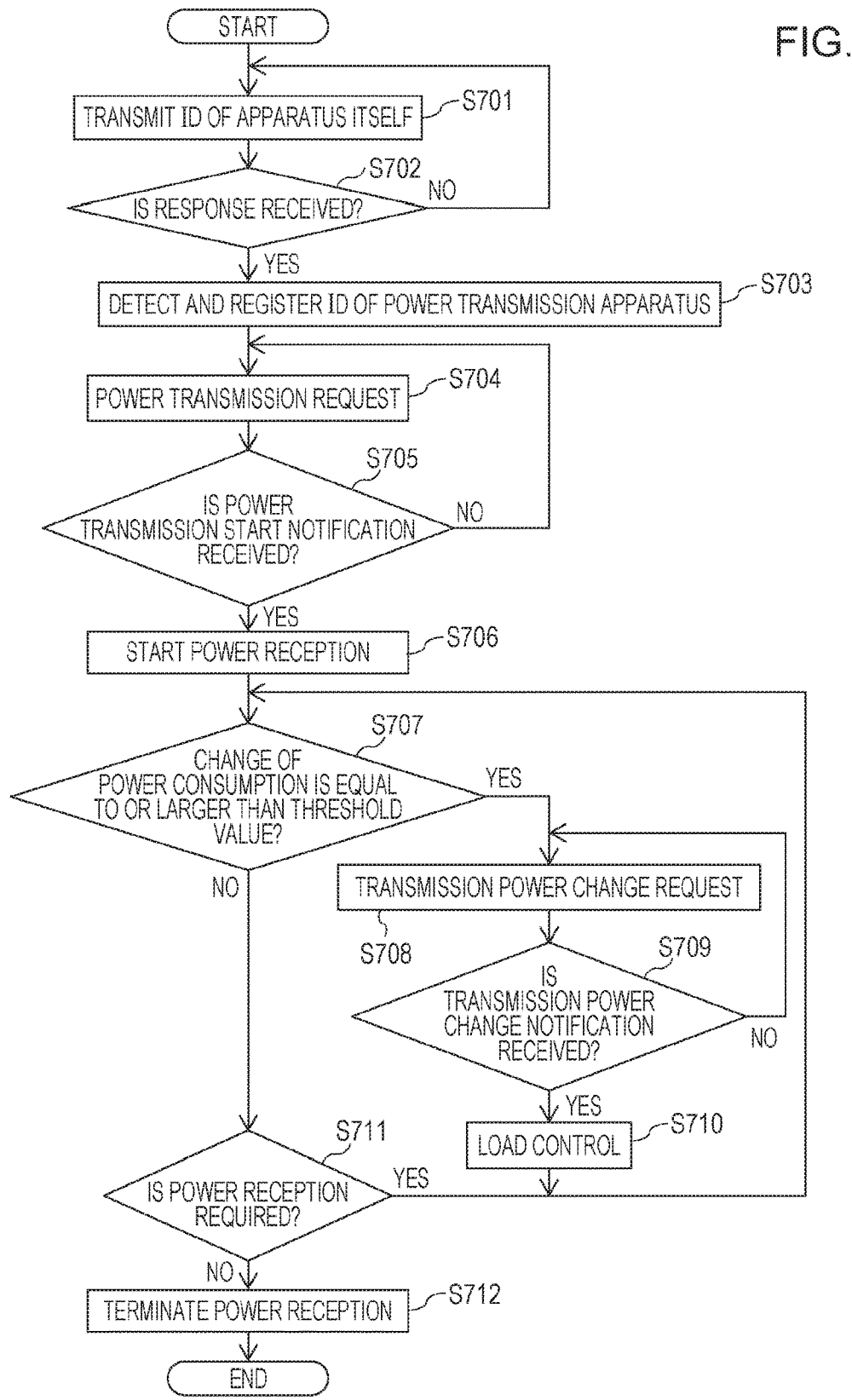
FIG. 7 is a flowchart illustrating operation of the power reception apparatus.

Next, operation of the power reception apparatus of this exemplary embodiment will be described with reference to a flowchart illustrated in FIG. 7. When a power reception process is started, the communication unit 123 of the power reception apparatus transmits an ID of the apparatus itself (S701). Information representing that the apparatus employs a predetermined wireless power transmission method may be transmitted along with the transmission of the ID in step S701. Subsequently, the reception unit 404 determines whether a response to the transmitted ID has been received from a power transmission apparatus (S702). When the response has not been received, the process returns to step S701. When the response has been received, the power reception apparatus registers an ID of the power transmission apparatus included in the received response in the memory 127 (S703). Subsequently, the request unit 403 transmits a request for starting power transmission including a value of required electric power to the power transmission apparatus (S704). The reception unit 404 determines whether a power transmission start notification has been received (S705). When the power transmission start notification has not been received, the process in step S704 is performed again. Note that, when receiving the power transmission unavailable notification from the power transmission apparatus 11, the power reception apparatus changes an amount of required electric power or transmits a power transmission request to another power transmission apparatus. When the power transmission start notification has been received, the power reception unit 120 receives electric power transmitted from the power transmission apparatus (S706). Thereafter, the power reception unit 120 supplies the received electric power to the load 126. The controller 406 operates the load 126 using the electric power supplied from the power reception unit 120.

The detection unit 401 detects an instruction for performing a certain operation of the load 126 while the load 126 is operated using the electric power supplied from the power transmission apparatus 11. Subsequently, the determination unit 402 determines whether change of power consumption caused by the detected operation instruction exceeds a predetermined threshold value (S707). When it is determined that the change of power consumption caused by the detected operation instruction exceeds the predetermined threshold value, the request unit 403 transmits a transmission power change request for requesting change of an amount of electric power in accordance with the change of the power consumption to the power transmission apparatus (S708). After the transmission power change request is transmitted, the reception unit 404 determines whether the transmission power change notification has been received from the power transmission apparatus (S709). The determination in step S708 is made in accordance with a determination as to whether the transmission power change notification has been received from the power transmission apparatus in a predetermined period of time (one second, for example) after the transmission power change request is transmitted. Note that, also when the transmission power change unavailable notification is received from the power transmission apparatus, it is determined that the transmission power change notification has not been received. If the transmission power change notification has not been received from the power transmission apparatus in step S708, the determination unit 402 transmits a transmission power change request again. Note that, the transmission power change unavailable notification is received when electric power larger than the capacity of the power transmission apparatus is requested. Accordingly, when the transmission power change unavailable notification is received, the transmission power change request may be transmitted again after an amount of required electric power is reduced. On the other hand, when the transmission power change notification has been received in step S709, the controller 406 controls and operates the load 126 in accordance with the operation instruction detected in step S707 (S710). The load 126 is controlled in accordance with the operation instruction only when the transmission power change notification is received in this exemplary embodiment. However, when delay is not allowed in operation, the controller 406 may operate the load 126 without waiting reception of the transmission power change notification. On the other hand, when the information on a time included in the transmission power change request is transmitted, the controller 406 may operate the load 126 after a period of time corresponding to the information on a time.

On the other hand, when the instruction for changing an operation of the load 126 is not detected in step S707, or when change of an amount of power consumption caused by the detected operation instruction does not exceed the predetermined threshold value, the power reception apparatus determines whether power reception is to be further performed. For example, it is determined whether the load 126 is no longer operated. When it is determined that the power reception is no longer performed in step S711, the power reception unit 120 terminates the power reception (S712) and the process is terminated. On the other hand, when it is determined that the power reception is to be further performed in step S711, the process from step S707 is performed again.

As described above, the power reception apparatus of this exemplary embodiment transmits a request for changing an amount of transmission power in accordance with change of an amount of power consumption before the amount of power consumption is changed to the power transmission apparatus. Accordingly, a state in which overvoltage is applied to the power transmission apparatus and another power reception apparatus which receives electric power transmitted from the power transmission apparatus or a state in which instantaneous interruption of power supply to a load occurs may be prevented. Consequently, stop of operation or occurrence of an error caused by damage due to the overvoltage of the internal circuits and the instantaneous interruption of electric power of the power reception apparatus may be reduced.

Other Embodiments

According to the present invention, when a load of a power reception apparatus is periodically changed, that is, in a case of a robot control motor or the like in production equipment, schedule of change of an amount of the load may be shared by transmission and reception apparatuses in advance and the transmission apparatus may perform power transmission control in accordance with the change of the amount of the load of the power reception apparatus as scheduled.

Furthermore, in the exemplary embodiment of the present invention, communication between the power transmission apparatus and the power reception apparatus is performed through the communication units included in the power transmission apparatus and the power reception apparatus. However, load modulation of a power reception unit of the power reception apparatus, power transmission voltage modulation of a power transmission unit of the power transmission apparatus, or the like may be used for the communication.

Furthermore, the present invention may be realized by executing the following process. Specifically, software (programs) which realizes the functions of the foregoing exemplary embodiment is supplied to a system or an apparatus through a network or various storage media, and a computer (or a CPU, an MPU, or the like) included in the system or the apparatus reads and executes the programs.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2013-156718, filed Jul. 29, 2013, which is hereby incorporated by reference herein in its entirety.

The invention claimed is:

1. A power reception apparatus comprising:
   a power reception unit configured to receive electric power from a power transmission apparatus in a wireless manner;
   a detection unit configured to detect an instruction for controlling a load unit which operates using the electric power received by the power reception unit;

a determination unit configured to determine whether a change of power consumption of the load unit, which would be caused in a case where the load unit changes an operation in response to the instruction detected by the detection unit, exceeds a threshold value; and a transmission unit configured to transmit, to the power transmission apparatus, a request for changing an amount of reception power, in a case where the determination unit determines that the change of power consumption of the load unit would exceed the threshold value, before the load unit changes the operation in response to the instruction, wherein, in a case where the determination unit determines that the change of power consumption of the load unit would not exceed the threshold value, the transmission unit does not transmit the request based on a result of a determination by the determination unit.

2. The power reception apparatus according to claim 1, wherein the transmission unit transmits the request when the power transmission apparatus transmits electric power to the power reception apparatus and another power reception apparatus.

3. The power reception apparatus according to claim 1, wherein the threshold value is defined in accordance with operation power of the load unit.

4. The power reception apparatus according to claim 1, further comprising:
a reception unit configured to receive a response to the request, the response representing that power transmission corresponding to an amount of reception power represented by the request being to be performed; and
a controller configured to control the load unit in accordance with the instruction in response to the reception by the reception unit.

5. The power reception apparatus according to claim 1, wherein transmission of electric power corresponding to power consumption of the load unit after the change of the power consumption is requested by the request.

6. The power reception apparatus according to claim 1, wherein the request includes information on a time when power transmission is performed in response to the request.

7. The power reception apparatus according to claim 1, wherein a plurality of amounts of reception power are requested by the request.

8. The power reception apparatus according to claim 1, wherein the transmission unit transmits the request for changing the amount of reception power in accordance with the change of power consumption of the load unit.

9. The power reception apparatus according to claim 1, wherein the threshold value is a value of the smallest power which is receivable by the power reception apparatus or a value of power which does not cause instantaneous interruption in the operation of the load unit.

10. The power reception apparatus according to claim 1, wherein the threshold value is a value that relates to power that does not cause instantaneous interruption of power transmission to a load unit of other power reception apparatus.

11. The power reception apparatus according to claim 1, wherein the threshold value is a value that relates to power that does not burden a circuit of other power reception apparatus with overvoltage.

12. The power reception apparatus according to claim 1, wherein the transmission unit transmits, to the power transmission apparatus, the request for changing the amount of reception power, so as to suppress influence on other transmission apparatuses.

13. The power reception apparatus according to claim 1, wherein in a case where the change of power consumption of the load unit decreases, the transmission unit transmits, to the power transmission apparatus, the request for reducing the amount of reception power.

14. The power reception apparatus according to claim 1, wherein in a case where the change of power consumption of the load unit increases, the transmission unit transmits, to the power transmission apparatus, the request for increasing the amount of reception power.

15. A power reception apparatus comprising:
a power reception unit configured to receive electric power from a power transmission apparatus in a wireless manner;
a detection unit configured to detect an instruction for controlling a load unit which operates using the electric power received by the power reception unit;
a determination unit configured to determine whether a change of power consumption of the load unit, which would be caused in a case where the load unit changes an operation in response to the instruction detected by the detection unit, exceeds a threshold value; and
a transmission unit configured to transmit, to the power transmission apparatus, a request for changing an amount of reception power, in a case where the determination unit determines that the change of power consumption of the load unit would exceed the threshold value, before the load unit changes the operation in response to the instruction,
wherein different threshold values are set for a case where the power consumption is increased and a case where the power consumption is reduced in accordance with the operation of the load unit based on the instruction.

16. A method for controlling a power reception apparatus including a power reception unit which receives electric power from a power transmission apparatus in a wireless manner, the method comprising:
detecting an instruction for controlling a load unit which operates using the electric power received by the power reception unit;
determining whether a change of power consumption of the load unit, which would be caused in a case where the load unit changes an operation in response to the detected instruction, exceeds a threshold value; and
transmitting, to the power transmission apparatus, a request for changing an amount of reception power, in a case where it is determined that the change of power consumption of the load unit would exceed the threshold value, before the load unit changes the operation in response to the instruction,
wherein, in a case where it is determined that the change of power consumption of the load unit would not exceed the threshold value, the request based on a result of a determination is not transmitted.

17. A non-transitory computer-readable storage medium storing a computer program for causing a computer included in a power reception apparatus which comprises a power reception unit configured to receive electric power from a power transmission apparatus in a wireless manner, to execute:
detecting an instruction for controlling a load unit which operates using the electric power received by a power reception unit;
determining whether a change of power consumption of the load unit, which would be caused in a case where the load unit changes an operation in response to the detected instruction, exceeds a threshold value; and transmitting, to the power transmission apparatus, a request for changing an amount of reception power, in a case where, in the determining, it is determined that the change of power consumption of the load unit would exceed the threshold value, before the load unit changes the operation is operated in response to the instruction, wherein, in a case where it is determined that the change of power consumption of the load unit would not exceed the threshold value, the request based on a result of a determination is not transmitted.

* * * * *

UNITED STATES PATENT AND TRADEMARK OFFICE
CERTIFICATE OF CORRECTION

PATENT NO. : 10,291,070 B2
APPLICATION NO. : 14/908100
DATED : May 14, 2019
INVENTOR(S) : Tadashi Eguchi Page 1 of 1

It is certified that error appears in the above-identified patent and that said Letters Patent is hereby corrected as shown below:

On the Title Page

Please correct Item (22):
From: --(22) PCT Filed: Jul. 8, 2014--
To: --(22) PCT Filed: July 18, 2014--

Signed and Sealed this
Fifth Day of May, 2020

Andrei Iancu
*Director of the United States Patent and Trademark Office*